(12) United States Patent
Maezawa

(10) Patent No.: US 8,279,237 B2
(45) Date of Patent: Oct. 2, 2012

(54) IMAGE PROCESSING DEVICE, IMAGE DISPLAY SYSTEM, IMAGE PROCESSING METHOD AND PROGRAM STORAGE MEDIUM

(75) Inventor: Hiroaki Maezawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 830 days.

(21) Appl. No.: 12/367,100

(22) Filed: Feb. 6, 2009

(65) Prior Publication Data

US 2010/0068994 A1  Mar. 18, 2010

(30) Foreign Application Priority Data

Sep. 16, 2008  (JP) .................................. 2008-236902

(51) Int. Cl.
G09G 5/02 (2006.01)
(52) U.S. Cl. ....................................................... 345/619
(58) Field of Classification Search .................. 345/619
See application file for complete search history.

(56) References Cited

U.S. PATENT DOCUMENTS

| | | | | |
|---|---|---|---|---|
| 5,309,234 A | * | 5/1994 | Kranawetter et al. | 348/473 |
| 5,729,704 A | * | 3/1998 | Stone et al. | 715/804 |
| 6,181,818 B1 | * | 1/2001 | Sato et al. | 382/170 |
| 6,501,441 B1 | * | 12/2002 | Ludtke et al. | 345/1.1 |
| 6,798,906 B1 | * | 9/2004 | Kato | 382/176 |
| 6,850,247 B1 | * | 2/2005 | Reid et al. | 345/611 |
| 7,391,423 B1 | * | 6/2008 | Manzari et al. | 345/619 |
| 8,035,632 B2 | * | 10/2011 | Seydoux | 345/207 |
| 2002/0002570 A1 | * | 1/2002 | Sakai et al. | 707/526 |
| 2003/0191756 A1 | * | 10/2003 | Oh | 707/3 |
| 2004/0001636 A1 | * | 1/2004 | Miceli et al. | 382/235 |
| 2005/0231504 A1 | * | 10/2005 | Heng et al. | 345/420 |
| 2006/0136839 A1 | * | 6/2006 | Makela | 715/786 |
| 2007/0074110 A1 | * | 3/2007 | Miksovsky et al. | 715/520 |
| 2008/0111841 A1 | * | 5/2008 | LeMay et al. | 345/699 |
| 2008/0253608 A1 | * | 10/2008 | Long et al. | 382/100 |
| 2011/0128289 A1 | * | 6/2011 | Zingaretti et al. | 345/428 |

FOREIGN PATENT DOCUMENTS

| | | |
|---|---|---|
| JP | A-4-248673 | 9/1992 |
| JP | A-6-19665 | 1/1994 |
| JP | A-8-305692 | 11/1996 |
| JP | A-11-86014 | 3/1999 |
| JP | A-2001-60247 | 3/2001 |
| JP | A-2006-238289 | 9/2006 |

OTHER PUBLICATIONS

Jul. 3, 2012 Office Action issued in Japanese Patent Application No. 2008-236902 (with translation).

* cited by examiner

*Primary Examiner* — Javid A Amini
(74) *Attorney, Agent, or Firm* — Oliff & Berridge, PLC

(57) ABSTRACT

An image processing device includes a principal partial image selector, a peripheral partial image selector, and a generator. The principal partial image selector selects a principal partial image, from plural partial images that constitute an original image. The peripheral partial image selector selects a peripheral partial image, which is disposed peripherally to the principal partial image in the original image and satisfies a pre-specified condition. The generator generates output image data, in which the principal partial image and the peripheral partial image are placed so as to preserve a positional relationship thereof in the original image, and the principal partial image and the peripheral partial image are reduced with scaling factors so as to be accommodated in output dimensions, a difference between the respective scaling factors being within a pre-specified range.

14 Claims, 14 Drawing Sheets

ESTIMATED CHARACTER SIZE

IMAGE PROCESSING DEVICE, IMAGE DISPLAY SYSTEM, IMAGE PROCESSING METHOD AND PROGRAM STORAGE MEDIUM

CROSS-REFERENCE TO RELATED APPLICATION

This application is based on and claims priority under 35 USC 119 from Japanese Patent Application No. 2008-236902 filed Sep. 16, 2008.

BACKGROUND

1. Technical Field

The present invention relates to an image processing device and method, an image display system and a program storage medium.

2. Related Art

Heretofore, technologies have been known that divide document images into regions (partial images), corresponding to categories such as illustrations, tables, headings, text and the like, and display the same. In such a technology, the partial images are stored as individual files, and levels of precedence are applied thereto for an order in which the partial images should be viewed by a user. Partial images with high levels of precedence are displayed sooner or are displayed larger. In this technology, when a partial image is displayed alone or plural partial images are displayed at a display, if the plural partial images to be displayed will not be accommodated in a screen, the partial images are displayed with an arrangement and relative dimensions or the like thereof having been altered.

SUMMARY

According to an aspect of the invention, an image processing device includes: a principal partial image selector that selects a principal image, from plural partial images that constitute an original image, to serve as a principal partial image; a peripheral partial image selector that selects a partial image, which is disposed peripherally to the principal partial image in the original image and satisfies a pre-specified condition, to serve as a peripheral partial image; and a generator that generates output image data, in which the principal partial image and the peripheral partial image are placed so as to preserve a positional relationship thereof in the original image, and the principal partial image and the peripheral partial image are reduced with scaling factors so as to be accommodated in output dimensions, a difference between the respective scaling factors being within a pre-specified range.

BRIEF DESCRIPTION OF THE DRAWINGS

An exemplary embodiment of the present invention will be described in detail based on the following, figures, wherein.

DETAILED DESCRIPTION

Herebelow, an exemplary embodiment of the present invention will be described in detail with reference to the drawings.

Figure 1:
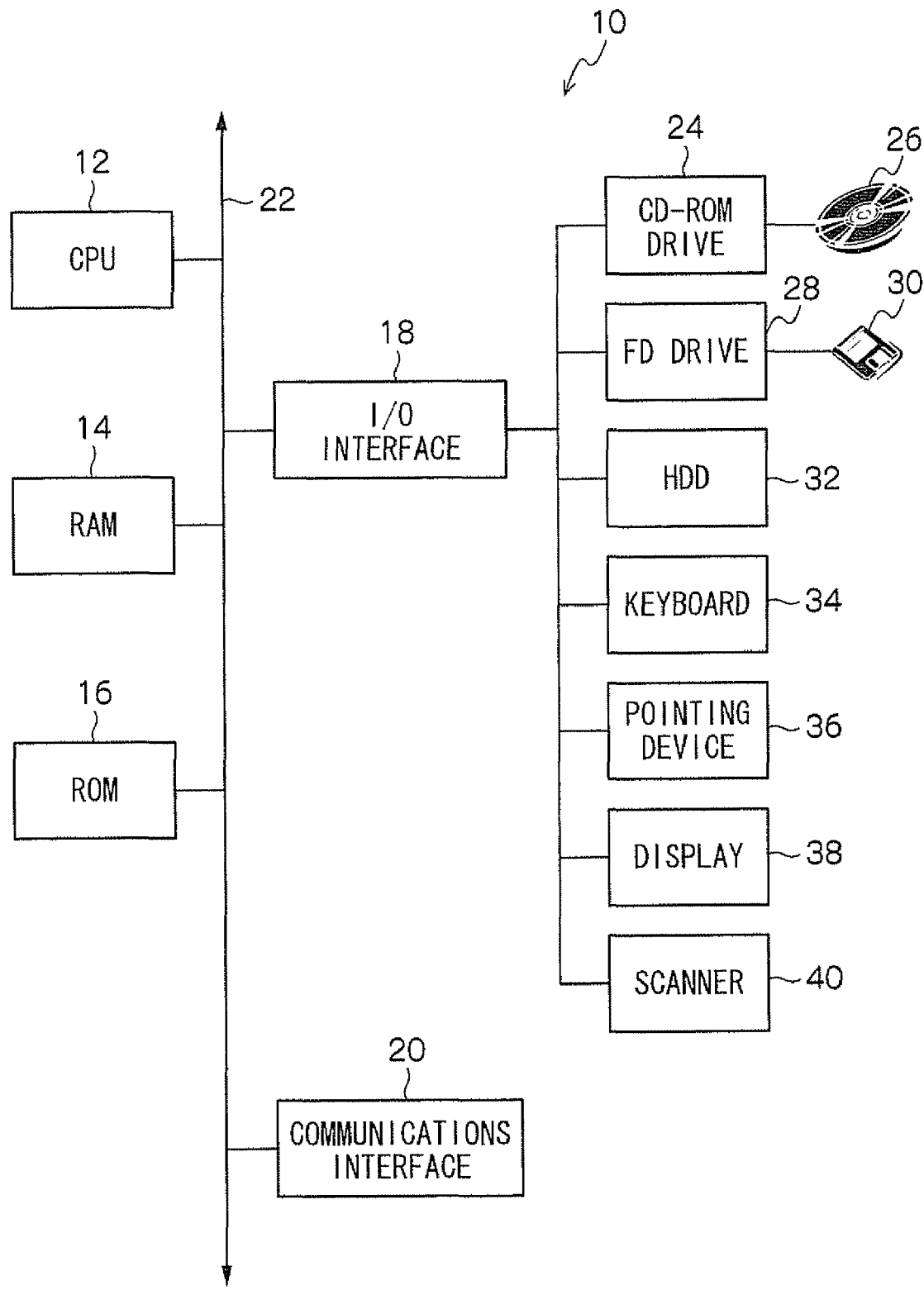
FIG. 1 is a block diagram showing schematic structure of an image processing device relating to an exemplary embodiment of the present invention.

FIG. 1 is a block diagram showing, schematic structure of an image processing device 10 relating to the exemplary embodiment. The image processing device 10 includes a CPU 12, a RAM 14, a ROM 16, an I/O (input/output) interface 18 and a communications interface 20. These are connected to one another by a bus 22.

A CD-ROM drive 24, an FD (flexible disc) drive 28 and an HDD (hard disk drive) 32 are connected to the I/O interface 18. The CD-ROM drive 24 reads data from a CD-ROM 26, which is a portable recording medium. The FD drive 28 reads and writes data at an FD 30, which is a portable recording medium. The HDD 32 reads and writes data at a built-in hard disc.

A keyboard 34 and a pointing device 36 are also connected to the I/O interface 18. The keyboard 34 is for inputting various kinds of information in accordance with operations by a user. The pointing device 36 inputs instructions, by a user indicating arbitrary positions therewith on a screen displayed at a display 38. The display 38 displays information such as images and the like in accordance with instructions from the CPU 12. Herein, a constitution is given in which the keyboard 34 and the pointing device 36 are provided as input devices. The display 338 may be used as an input device if the display 38 is a touch-panel display. That is, input devices are not particularly limited to the keyboard 34 and the pointing device 36.

A scanner 40, which reads images from originals, is connected to the I/O interface 18. The CPU 12 instructs the scanner 40 for an operation of reading an image of an original, acquires the image data read by the scanner 40, and stores the data in the RAM 14.

Figure 14A:
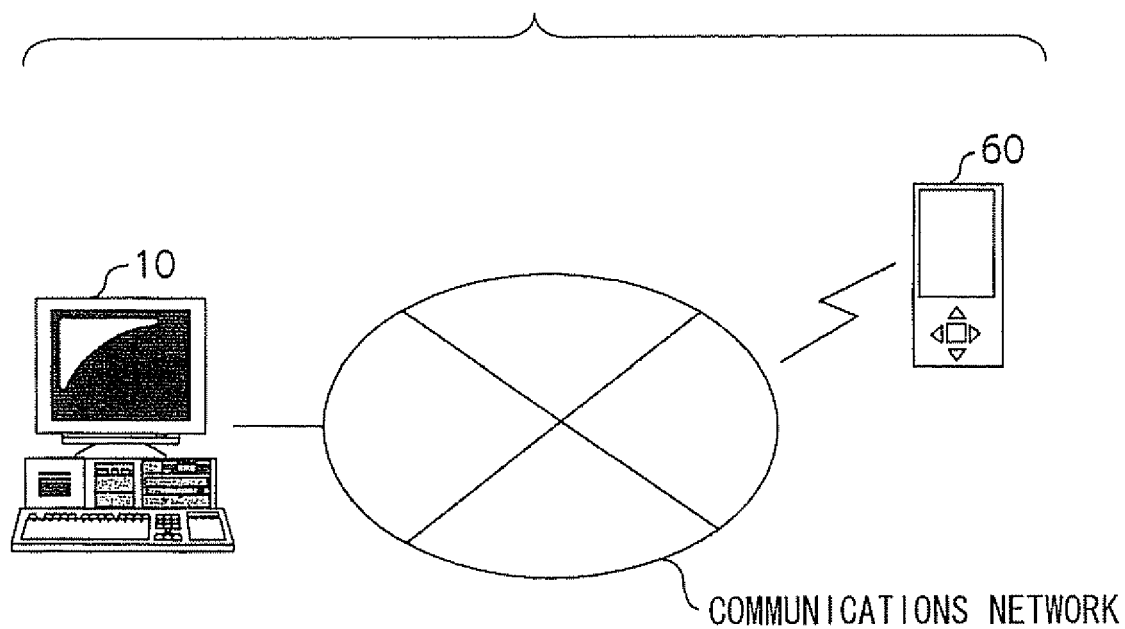
FIG. 14A is a diagram showing a state in which the image processing device and a display device are connected to a communications network.

The communications interface 20 is connected to a network, such as a telecommunications line, a LAN or the like. Via the communications interface 20, the image processing device 10 exchanges information to and from other terminals (for example, a display device 60) connected to the network (see FIG. 14A).

The CPU 12 executes programs stored in the ROM 16 and the HDD 32 or the like. The RAM 14 is employed as a frame memory for temporarily storing various kinds of image data, such as image data inputted from another terminal via the communications interface 20, image data inputted from the scanner 40 or the like, newly generated image data, and so forth. The RAM 14 is also employed as a work memory during execution of programs.

A recording medium that stores the programs executed by the CPU 12 is not to be limited to the above-mentioned ROM 16, HDD 32 and the like. This recording medium may be the CD-ROM drive 24, the FD drive 28 or the like. For example, although not illustrated, the recording medium may be a portable recording medium such as a DVD disc, a magneto-optical disc, an IC card or the like, a storage medium such as an HDD or the like that is provided outside the image processing device 10, or the like. Further yet, the recording medium may be a database connected through a network, another computer system and a database thereof, or a propagation medium such as a carrier wave in an electrical communications circuit.

Figure 2:
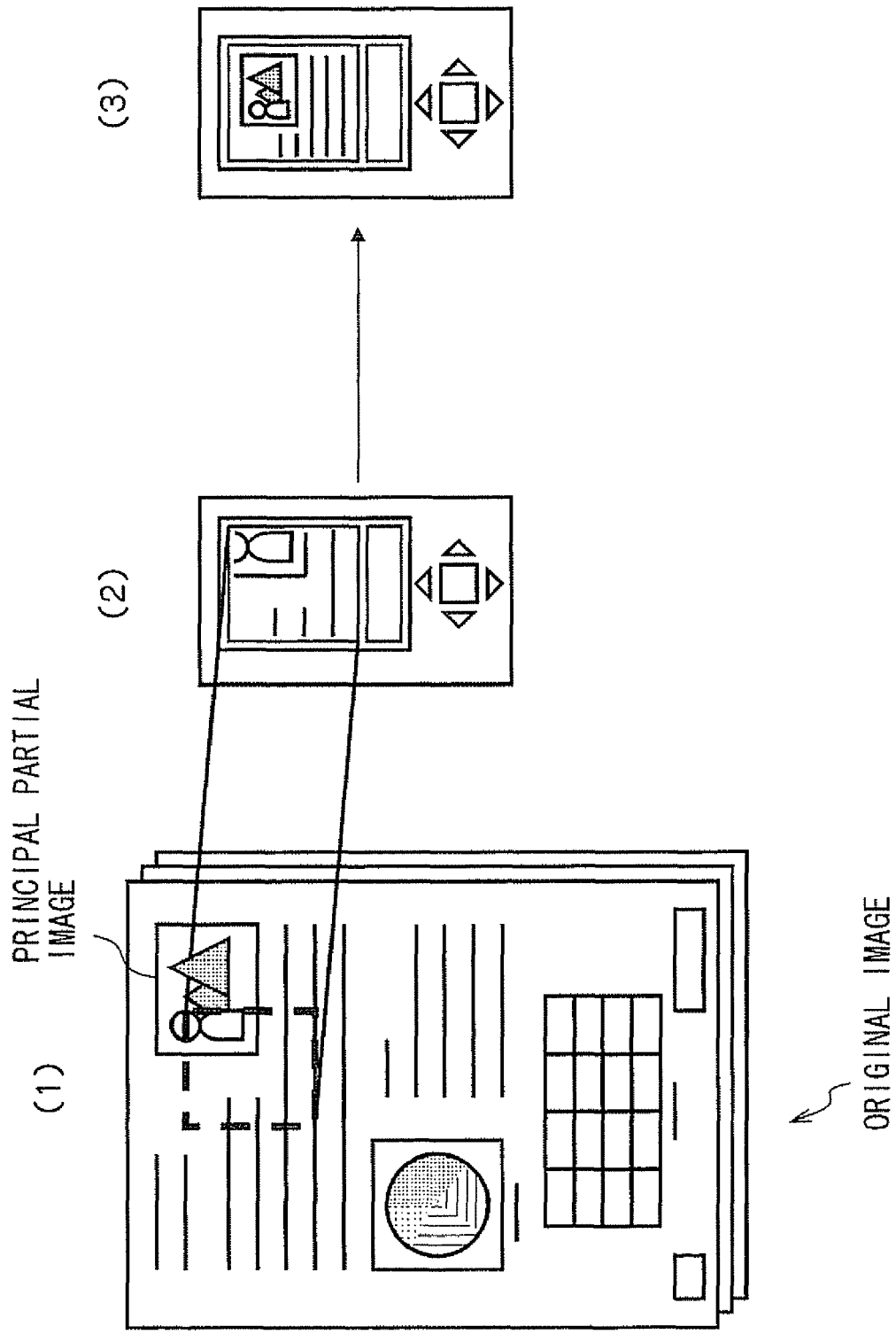
FIG. 2 is a descriptive view describing, in summary, a process executed by the image processing device relating to the exemplary embodiment.

The image processing device 10 of the present exemplary embodiment features a function that generates image data for displaying a portion of an image, which has been inputted by scanning, fax reception or the like (see FIG. 2 (1)), at a small display screen of a display device 60 (for example, a computer, a PDA (portable information terminal), a portable telephone or the like) with a lower resolution than the original image. The image data herein is not limited to display purposes, and may be generated for printing purposes.

FIG. 2 (2) illustrates a display example for a case in which an image of a portion extracted from an original image (which is an image with the same display magnification as the original image) is displayed at a small display screen. In contrast, in the image processing device 10 of the present exemplary embodiment, image data of an output image (hereinafter referred to as output image data) that includes a partial image selected as a main image (a principal partial image) and partial images therearound (peripheral partial images) is generated by processing described hereinafter, for a state in which the layout of the original image is substantially maintained, as shown in FIG. 2 (3). For example, when the content of a partial image such as an illustration, a table, a photograph or the like is to be discerned, the content may not be adequately discerned by viewing of the image alone. However, in the present exemplary embodiment, the output image data is generated such that images around the image (for example, text images such as headings and the like, or the like) are included in the display.

Figure 14B:
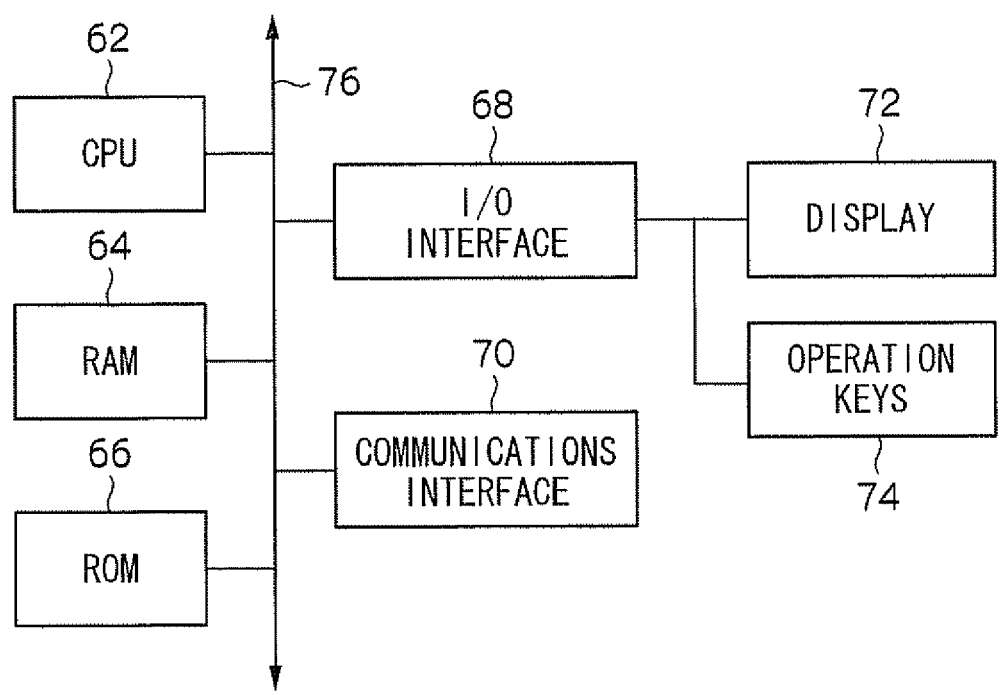
FIG. 14B is a diagram showing general structure of the display device.

FIG. 14B shows general structure of the display device 60. The display device 60 includes a CPU 62, a RAM 64, a ROM 66, an I/O (input/output) interface 68 and a communications interface 70. These are connected to one another by a bus 76.

Operation keys 74 and a display 72 are connected to the I/O interface 68. The operation keys 74 are for inputting various kinds of information in accordance with operations by a user. The display 72 displays information such as images and the like in accordance with instructions from the CPU 62.

The communications interface 70 is connected to a network, such as a telecommunications line, a LAN or the like. Via the communications interface 70, the display device 60 exchanges information to and from other terminals connected to the network (for example, the image processing device 10).

The CPU 62 executes programs stored in the RAM 64. The RAM 64 is employed as a frame memory for temporarily storing image data inputted from another terminal via the communications interface 70. The RAM 64 is also employed as a work memory during execution of programs.

Herebelow, generation of output image data which is carried out by the CPU 12 of the image processing device 10 relating to the present exemplary embodiment will be described.

Figure 3:
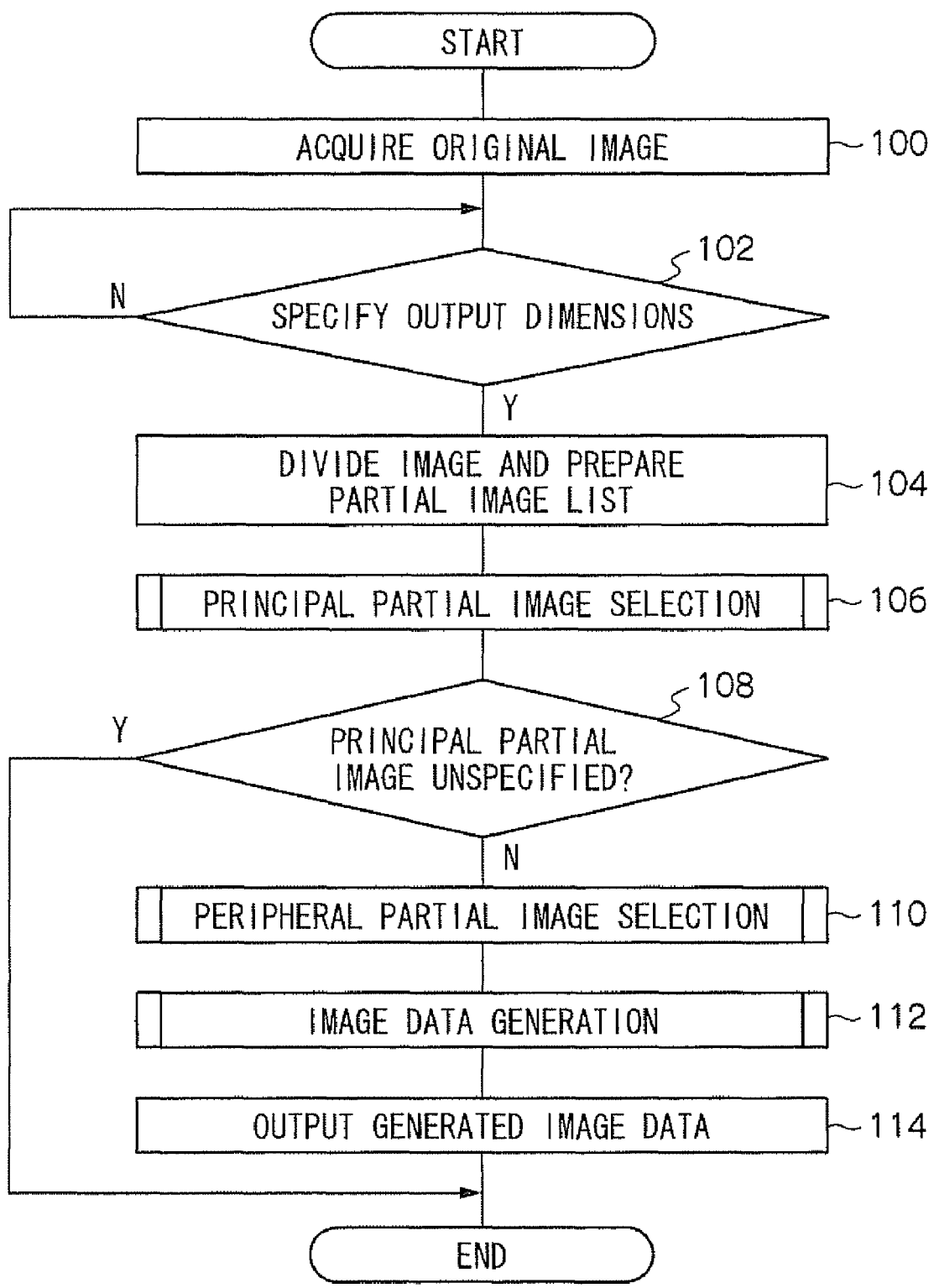
FIG. 3 is a flowchart showing an example of flow of a main routine of an output image data generation program.

FIG. 3 is a flowchart showing an example of flow of a main routine of an output image data generation program that is executed by the CPU 12.

In step 100, the CPU 12 acquires image data of an image that is an original for which output image data is to be generated. This image data of the original image may be image data obtained by reading an original with the scanner 40 or the likes may be image data generated by image creation software, may be image data inputted from an external terminal via the communications interface 20, and may be image data stored at a recording medium such as the CD-ROM 26, the FD 30 or the like. The CPU 12 stores the acquired image data in the RAM 14, the HDD 32 or the like. Hereinafter, the acquired image data of the original image is referred to as original image data. The original image may be just a one-page image corresponding to a single sheet of output paper, or may be constituted by images of plural pages.

In step 102, the CPU 12 displays at the display 38 an original image based on the original image data, and prompts the user to designate output dimensions. The output dimensions to be designated here are dimensions of an output image. For example, in a case of display of an image at the display of a portable telephone or the like, an image size that can be displayed by that display is specified as the output dimensions. The user indicates a region with the pointing device 36 and specifies the output dimensions while observing the image displayed at the display 38, or specifies the output dimensions by directly inputting pixel numbers for a horizontal direction and a vertical direction.

Here, description is given for an example of a case in which a user specifies the output dimensions. However, if a screen size of the terminal that will perform the display is known beforehand, the CPU 12 may automatically specify the screen size as the output dimensions. Further, the CPU 12 may act as a system that automatically acquires the output dimensions via the network. When the output dimensions have been specified in step 102, the CPU 12 advances to step 104.

In step 104, the CPU 12 performs image division for the original image on the basis of the original image data, and prepares an image list.

The meaning of the term "image division" includes division of an image into plural partial images corresponding to pre-specified classifications. The division is performed in accordance with categories (object classes) that have been specified beforehand, such as text, CG illustrations, tables, photographs and so forth. Here, a CG illustration means a computer graphics image, such as a line image with simple colors or the like, which is prepared in graphics software or the like. A table means a collection of texts with matrix elements that are enclosed by ruled lines, which is prepared in a spreadsheet or the like.

CG illustrations may be further divided, distinguishing between graphs and picture illustrations other than graphs.

Alternatively, CG illustrations, photographs and the like may be assigned to a collective category of pictures. Further, partial images with the text category may be divided distinguishing between more detailed categories such as, for example, titles (regions of text which are disposed at the top of an original image and are made up of a single row of characters with a large text size), headings (regions of text made up of a single row of letters with a text size smaller than titles), body text (regions of text formed of lines of text that exceed one row), and the like.

The image division is carried out using a widely known algorithm. For example, an inputted original image is divided into body text partial images, table partial images, illustration partial images and so forth by the layout recognition processing of character recognition software that recognizes characters in inputted images. Where a divided partial image has the appearance of body text, character recognition processing is carried out in accordance with rows. Where there is a table partial image, the structure thereof is analyzed, characters are sorted from ruled lines, and then character recognition processing is applied. The algorithm of this layout recognition processing may also be used for image division.

The image separation may be carried out on the basis of variation conditions in the image data. For example, a region in which the image data has peaks at white and black localities and steep variations in density is a text partial image, and a region in which variations in density of the image data are relatively gentle is a photograph partial image.

Further, characters that are to be recognized may have the appearance of being structured by collections of line portions. Hence, a technique may be used in which text regions are recognized by extracting line portions with arbitrary widths, of text, ruled lines and the like, from the original image, and other regions are recognized as picture regions.

Image data of the partial images obtained by image division as described above are stored in respective pre-specified regions of the RAM 14.

The CPU 12 registers each of the partial images obtained by the image division in an image list. The image list registers information on positions, ranges and categories of the partial images in association. Partial images with the same category but different positions are registered in the image list as different partial images. The position information referred to here includes information on both a position of the partial image within the whole of the original image, and a position of placement of the partial image within an individual page constituting the original image. A registration sequence is not particularly limited. For example, the top-left corner of the original image may be an origin point (if the original image is constituted by plural pages, the top-left corner of the image on the first page), and the partial images may be registered in order of closeness to the origin point.

Figure 9:
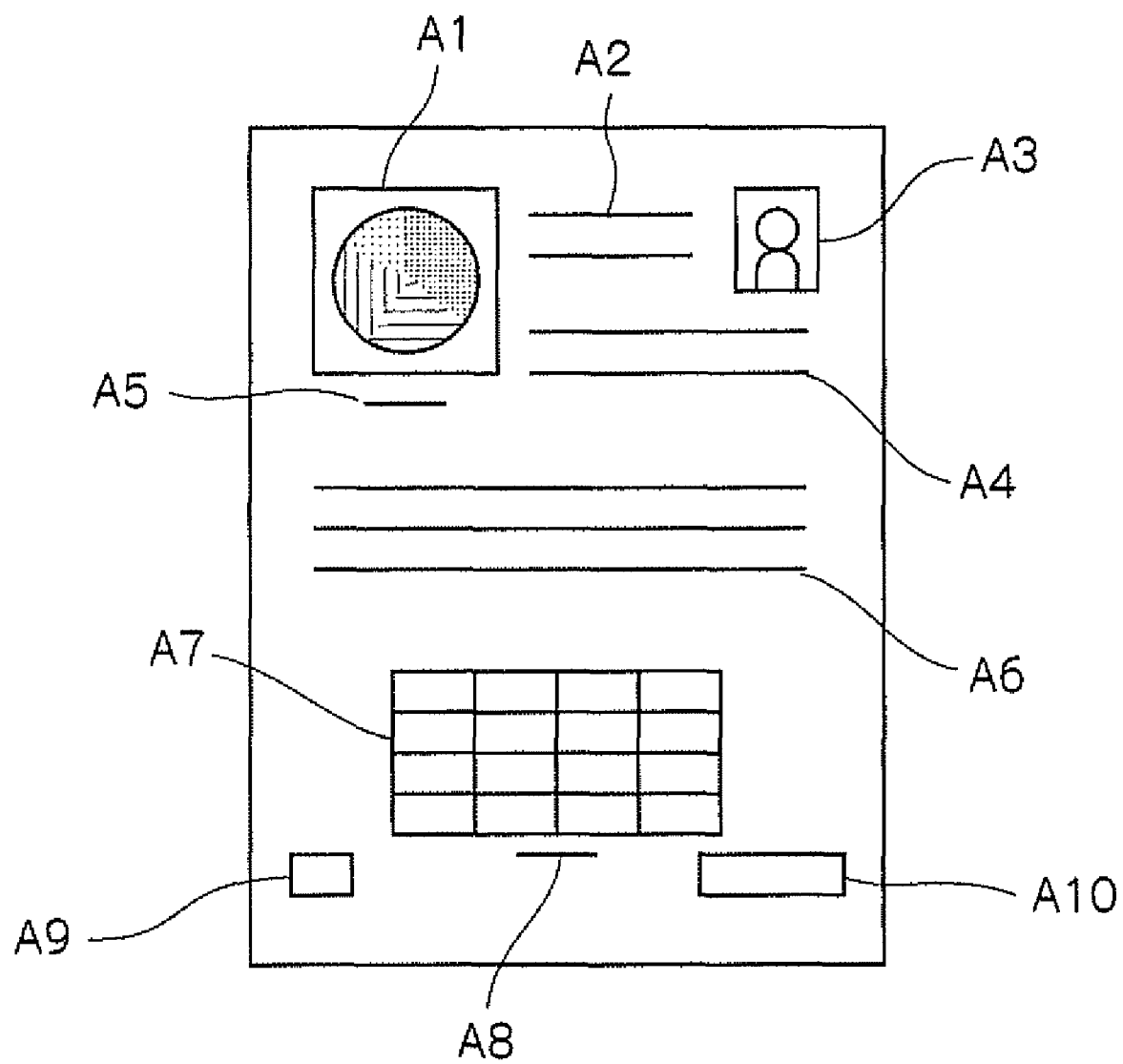
FIG. 9 is a descriptive view describing a specific example of an original image and image division processing.

For example, if the original image is the image shown in FIG. 9, ten partial images are registered in the image list: an illustration partial image A1, a text partial image A2, a photograph partial image A3, a text partial image A4, a text partial image A8, a text partial image A6, a table partial image A7, a text partial image A8, an illustration partial image A9 and an illustration partial image A10.

Here, examples of image division of an original image have been described. However, if image data that has already been subjected to image division is acquired in step 100, this image division processing is not necessary.

In step 106, the CPU 12 carries out principal partial image selection, which selects a principal partial image. The meaning of the term "principal partial image" includes a partial image that is a principal portion (for example, a portion that a user should check or a portion that should be observed) of the partial images that constitute the output image.

Figure 4:
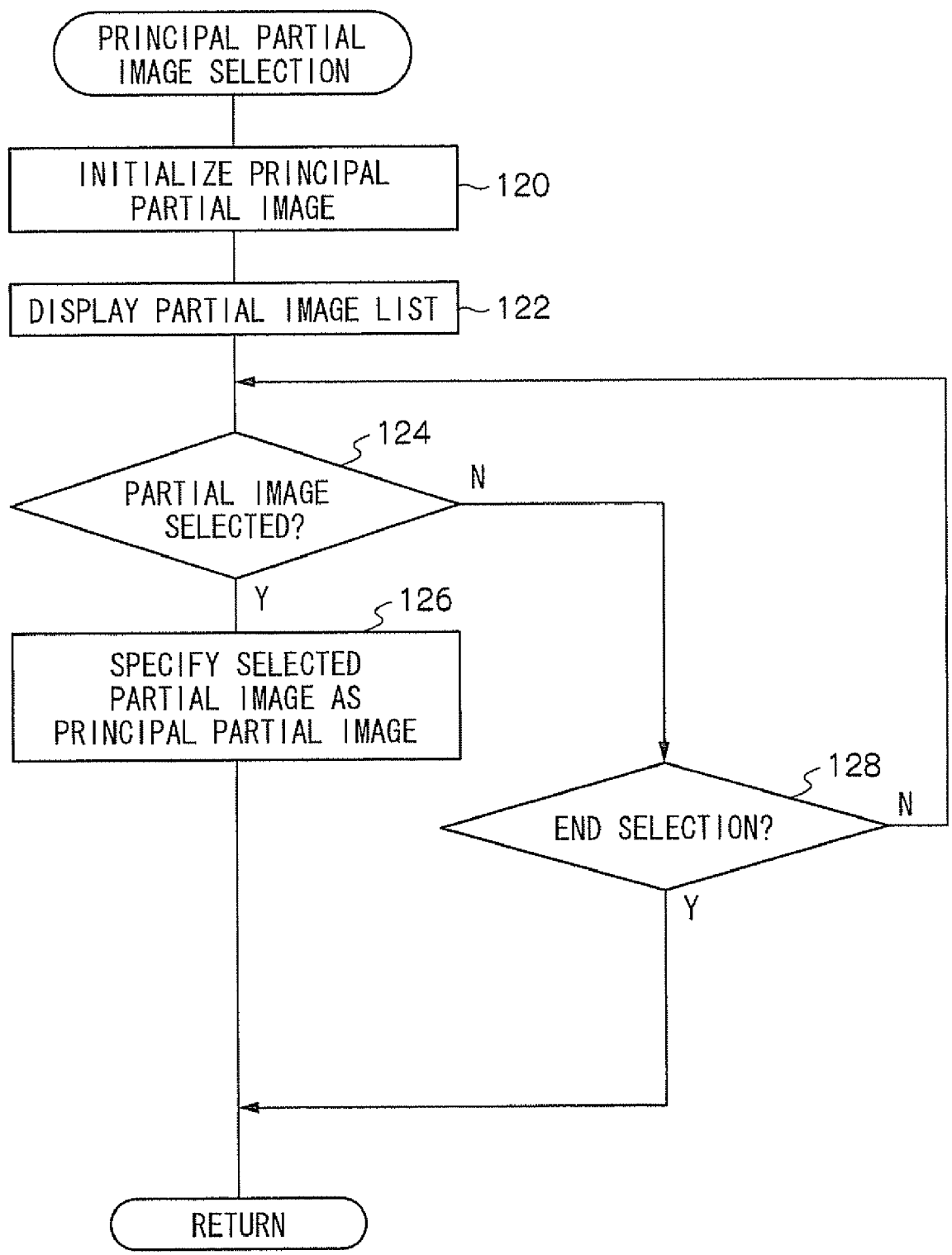
FIG. 4 is a flowchart showing an example of principal partial image selection.

FIG. 4 is a flowchart showing an example of the principal partial image selection that is executed by the CPU 12.

In step 120, the CPU 12 initializes specification of the principal partial image.

In step 122, the CPU 12 displays contents of the image list. For example, information on the respective positions, ranges, and categories of the partial images registered in the image list may be displayed in registration order, or the partial images themselves may be displayed separately. Alternatively, the whole original image may be displayed and line images defining the partial images superimposed on the displayed original image. The user designates a principal partial image by selecting any of the partial images with the pointing device 36 or the keyboard 34 while observing the image displayed at the display 38, or the like.

In step 124, the CPU 12 determines whether or not a partial image has been selected by the user. When it is determined that a partial image has been selected, in step 126, the CPU 12 specifies the selected partial image as the principal partial image.

On the other hand, if the CPU 12 determines in step 128 that an end instruction has been inputted without a partial image being selected in step 124, the principal partial image selection ends without a principal partial image being specified.

Figure 5:
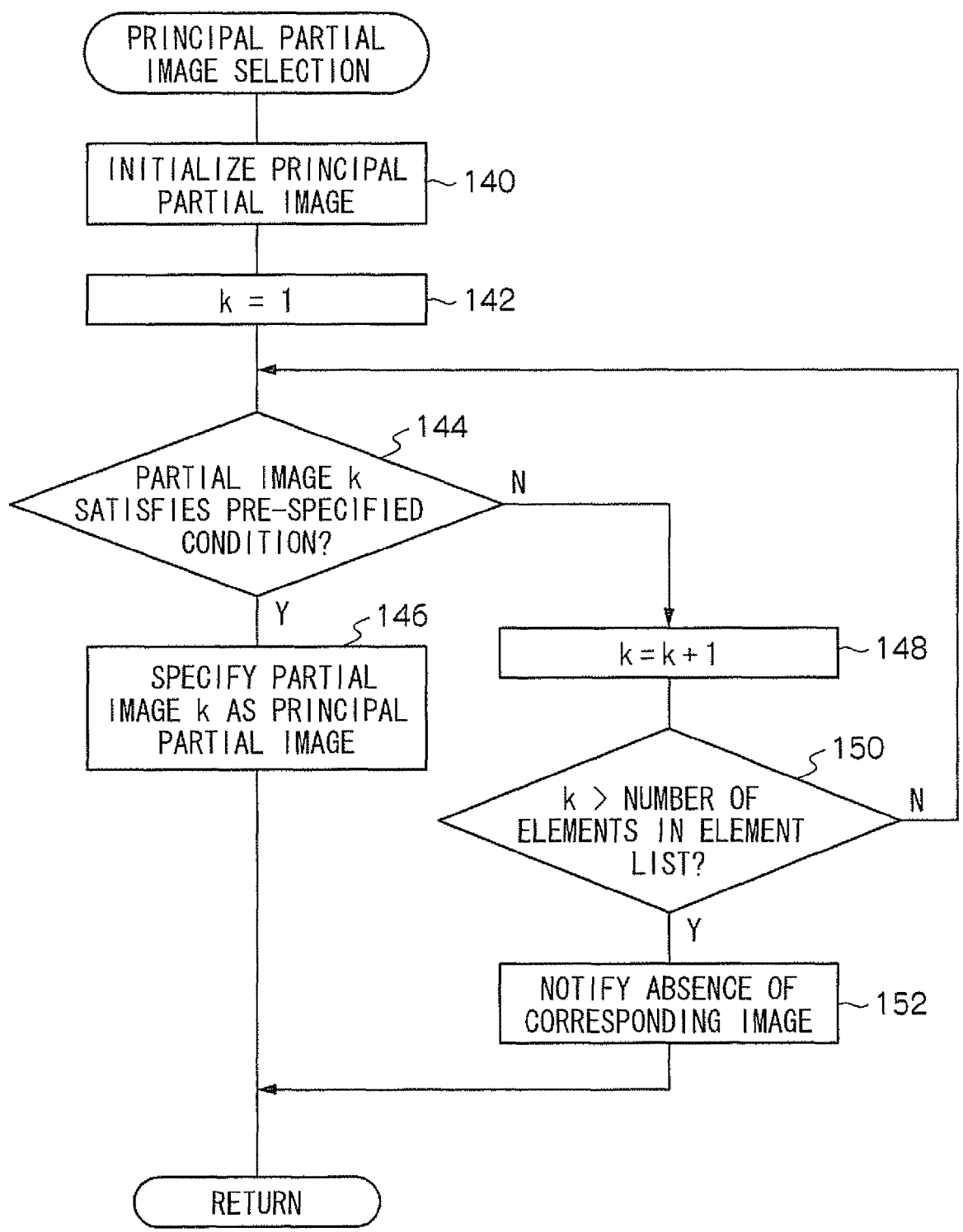
FIG. 5 is a flowchart showing an example of principal partial image selection in a case in which a principal partial image is selected and specified automatically.

Here, an example in which the principal partial image is selected by a user has been described. However, structures are possible in which the principal partial image is selected and specified automatically by the image processing device 10. FIG. 5 shows an example of a flowchart of principal partial image selection in a case in which the principal partial image is selected and specified automatically.

In step 140, the CPU 12 initializes specification of the principal partial image.

In step 142, the CPU 12 sets a variable 'k' to 1.

In step 144, the CPU 12 determines whether or not a partial image registered at position 'k' in the image list satisfies a pre-specified condition(s). For example, if the pre-specified condition is a condition that the category is 'table', the CPU 12 determines whether or not the category of the partial image at position 'k' is 'table'. If the CPU 12 determines that the partial image in position 'k' satisfies the pre-specified condition, then in step 146 the partial image at position 'k' is specified as the principal partial image.

On the other hand, if the CPU 12 determines in step 144 that the partial image at position 'k' in the image list does not satisfy the pre-specified condition, then 'k' is incremented by 1 in step 148.

In step 150, the CPU 12 determines whether or not 'k' exceeds the number of partial images registered in the image list. If the CPU 12 determines in step 150 that 'k' does not exceed the number of partial images registered in the image list, the CPU 12 returns to step 144 and the same processing as described above is repeated.

On the other hand, if the CPU 12 determines in step 150 that 'k' exceeds the number of partial images registered in the image list, then in step 152 the CPU 12 gives notice that there is no corresponding image (for example, displays a message at the display 38 or the like, or suchlike), and ends the principal partial image selection.

Herein, conditions for selecting a principal partial image from the partial images registered in the image list are not limited to the condition exemplified above. Conditions may specify one or more of a position of placement in a page constituting the original document, a position in the whole original document, a size, a pixel characteristic and a category. The meaning of the term "pixel characteristic" includes image characteristics which are found from pixel values included in the partial image and define appearance, content or the like. For example, a pixel characteristic may be a principal color component included in the color composition, a number of edge components, a brightness, and if the category is text, a spacing of the characters, a number of lines or the like.

For example, the conditions may be that the partial image is of category 'photograph' and is disposed at a position closest to the top left corner of the image of the first page of the original image. Alternatively, the conditions may be that the partial image is of category 'photograph' and, of partial images with a size of less than 100×100 pixels, is disposed earliest in the whole original image. Alternatively, the conditions may be that the partial image is a 'heading' image that is disposed second among 'heading' images included in the whole original image, or that the partial image is a 'table' image that is disposed earliest among 'table' images included in the whole original image.

Further conditions may be that, for example, the number of edge regions in the partial image is large, that the partial image is reddish (i.e., pixels in a specific range of the RGB space exceed a designated proportion), that the image is black and white (i.e., there are no chromatic components), or that the image is an official seal (a text region contained in a circle, with a single color).

When the principal partial image selection of step 106 ends, in step 108, the CPU 12 determines whether or not the principal partial image is unspecified. For example, the principal partial image is unspecified if, in the principal partial image selection illustrated in FIG. 4, the determination of step 124 is negative and the determination of step 128 is positive. Alternatively, the principal partial image is unspecified if, in the principal partial image specification processing illustrated in FIG. 5, the determination of step 144 is negative and the determination of step 150 is positive.

If it is determined in step 108 that the principal partial image is unspecified, the output image data generation ends. Alternatively, if it is determined that the principal partial image is not unspecified in step 108, that is, that one of the partial images has been specified as the principal partial image, the CPU 12 advances to step 110.

In step 110, peripheral partial image selection is carried out, which selects peripheral partial images. Peripheral partial images are partial images disposed peripherally to the principal partial image in the original image, and are partial images to be included with the principal partial image in the output image.

Figure 6:
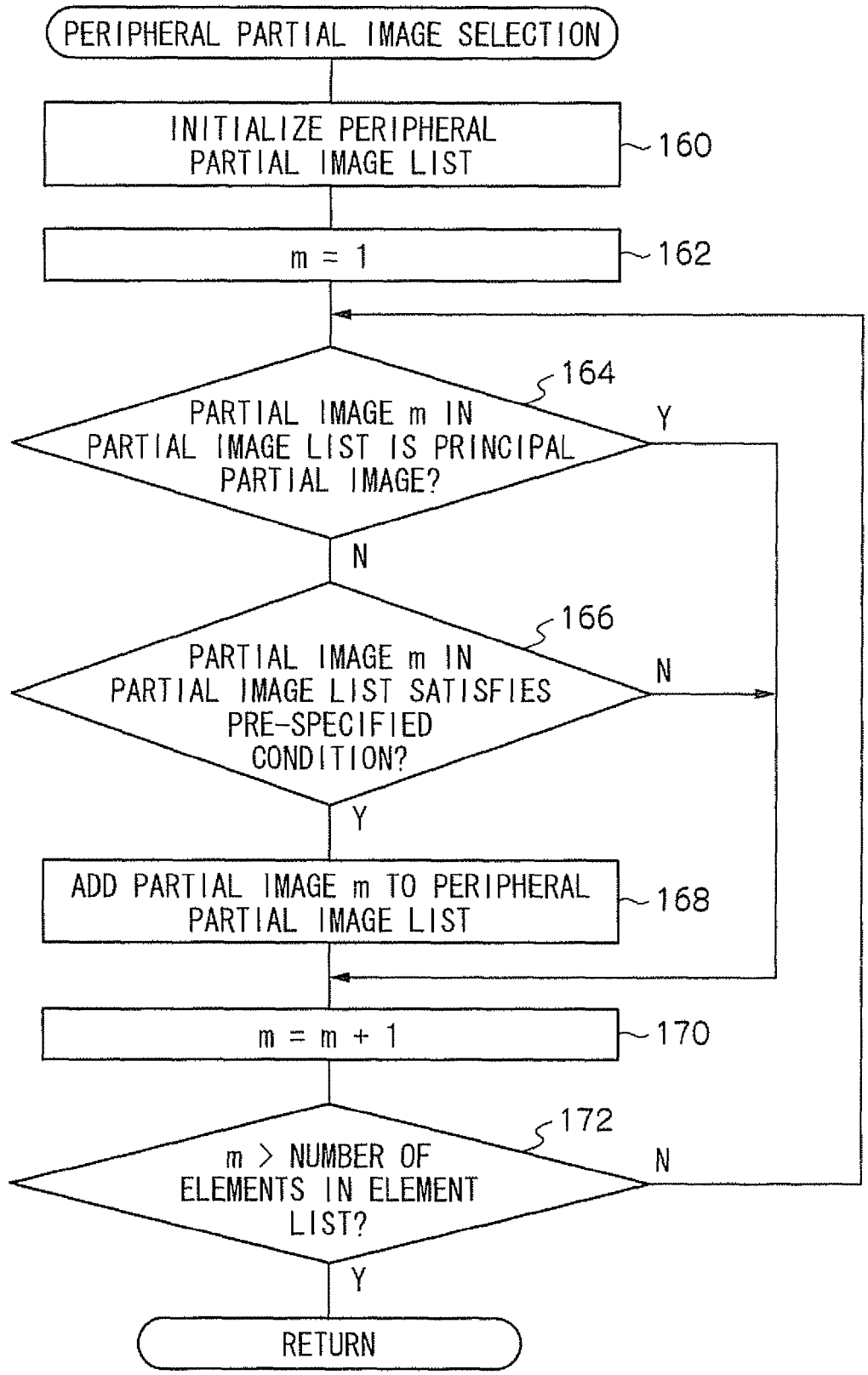
FIG. 6 is a flowchart showing an example of peripheral partial image selection.

FIG. 6 is a flowchart showing an example of the peripheral partial image selection executed by the CPU 12.

In step 160, the CPU 12 initializes a peripheral partial image list.

In step 162, the CPU 12 sets a variable 'm' to 1.

In step 164, the CPU 12 determines whether or not the partial image registered at position 'm' in the image list is the principal partial image. If the CPU 12 determines that the peripheral image registered at position 'm' in the image list is the principal partial image, the CPU 12 proceeds to step 166.

In step 166, the CPU 12 determines whether or not the partial image registered at position 'm' in the image list satisfies a pre-specified condition(s). A configuration in which a user may specify this condition in advance is possible. If the CPU 12 determines that the partial image in position 'm' of the image list satisfies the pre-specified condition, then in step 168 the partial image at position 'm' is registered as a peripheral partial image.

Here, description is given for an example of a case in which peripheral partial images are selected by a condition of "being an image completely contained in a region defined by the origin point at the top left of the principal partial image and the output dimensions".

Figure 10:
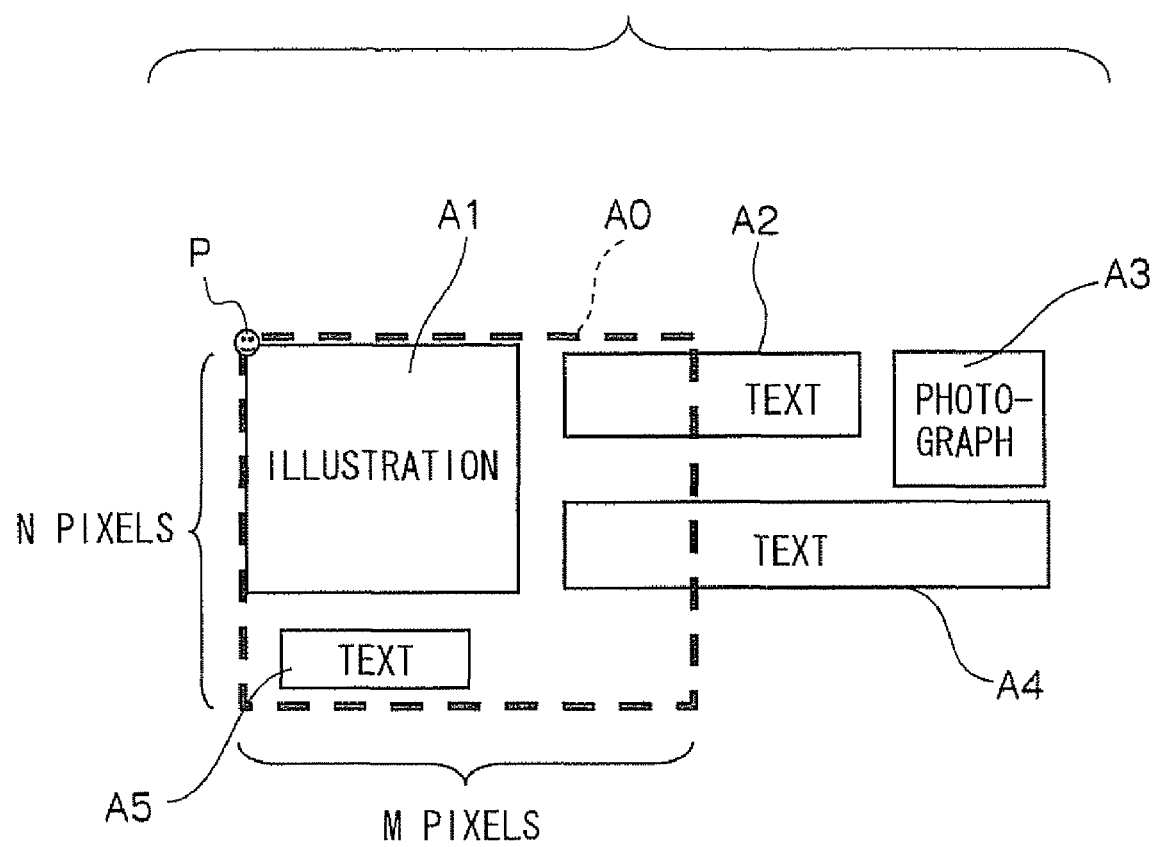
FIG. 10 is a view schematically showing a state of arrangement of partial images that are present in an upper-half region of the original image illustrated in FIG. 9.

FIG. 10 is a view schematically showing a state of arrangement of partial images that are present in an upper-half region of the original image illustrated in FIG. 9.

In a case in which the principal partial image is the illustration partial image A1, and the output dimensions are M×N pixels, the region defined by the output dimensions from the top-left origin point P of the principal partial image is the region A0 that is shown by broken lines in FIG. 10. Accordingly, images that are completely contained within the region A0 defined by the top-left origin point P of the principal partial image A1 and the output dimensions are, in this case, only the text partial image A5. Therefore, the text partial region A5 is registered in the peripheral partial image list.

In a case of the condition exemplified above, if the output dimensions are small, there may be no partial images completely contained within the region A0. Therefore, a condition may be specified of "being an image completely contained in a region defined by the origin point at the top left of the principal partial image and the output dimensions when the whole original image is reduced within a scope of visibility" (for example, reduction with the top-left origin point of the principal partial image serving as a central reference point for image reduction).

Here, the scope of visibility means a scope in which, when the whole image is reduced, a reduced value after reduction of one or more of the following is at least a pre-specified threshold value: a number of colors, a spatial frequency, a number of edges, and a number of line portions.

If an image is excessively reduced, the number of colors, the spatial frequency, the number of edges and the number of line portions are reduced and the image may be in a state in which it is impossible to discern or difficult to discern the content of the original image with the human eye. Accordingly, the above-mentioned threshold value(s) may be set such that even if the image is reduced, in later-described output image data generation, the principal partial image and the peripheral partial images will not be in a state in which it is impossible to discern the content or a state in which it is difficult to discern the content. For example, test images of various kinds are reduced with the reduction scaling factor increasing stepwise, while it is checked whether the content thereof can be discerned. Then, the number of colors, spatial frequency, number of edges and number of line portions are found when the test images are reduced by a maximum reduction scaling factor within the scope in which the contents of the original images can be discerned with the human eye. Differences between these values and original values are set as the threshold values. A threshold value may be set to be the same for all categories of the principal partial image and peripheral partial images, or the threshold value may be varied in accordance with categories of the principal partial image and peripheral partial images.

On the other hand, if the determination in step 164 is positive (the partial image at position 'm' is the principal partial image) or the determination of step 166 is negative (the partial image at position 'm' does not satisfy the pre-specified condition) or when the processing of step 168 has ended, in step 170, the CPU 12 increments 'm' by 1.

In step 172, the CPU 12 determines whether or not 'm' exceeds the number of partial images registered in the partial image list. If the CPU 12 determines in step 172 that 'm' does not exceed the number of partial images registered in the partial image list, the CPU 12 returns to step 164 and the same processing as described above is repeated.

On the other hand, if the CPU 12 determines in step 172 that 'm' exceeds the number of partial images registered in the partial image list, the CPU 12 ends the peripheral partial image selection.

By the processing described above, all partial images that satisfy the pre-specified condition(s) for selecting peripheral partial images are selected from the partial images registered in the partial image list, and are registered in the peripheral partial image list.

Figure 7:
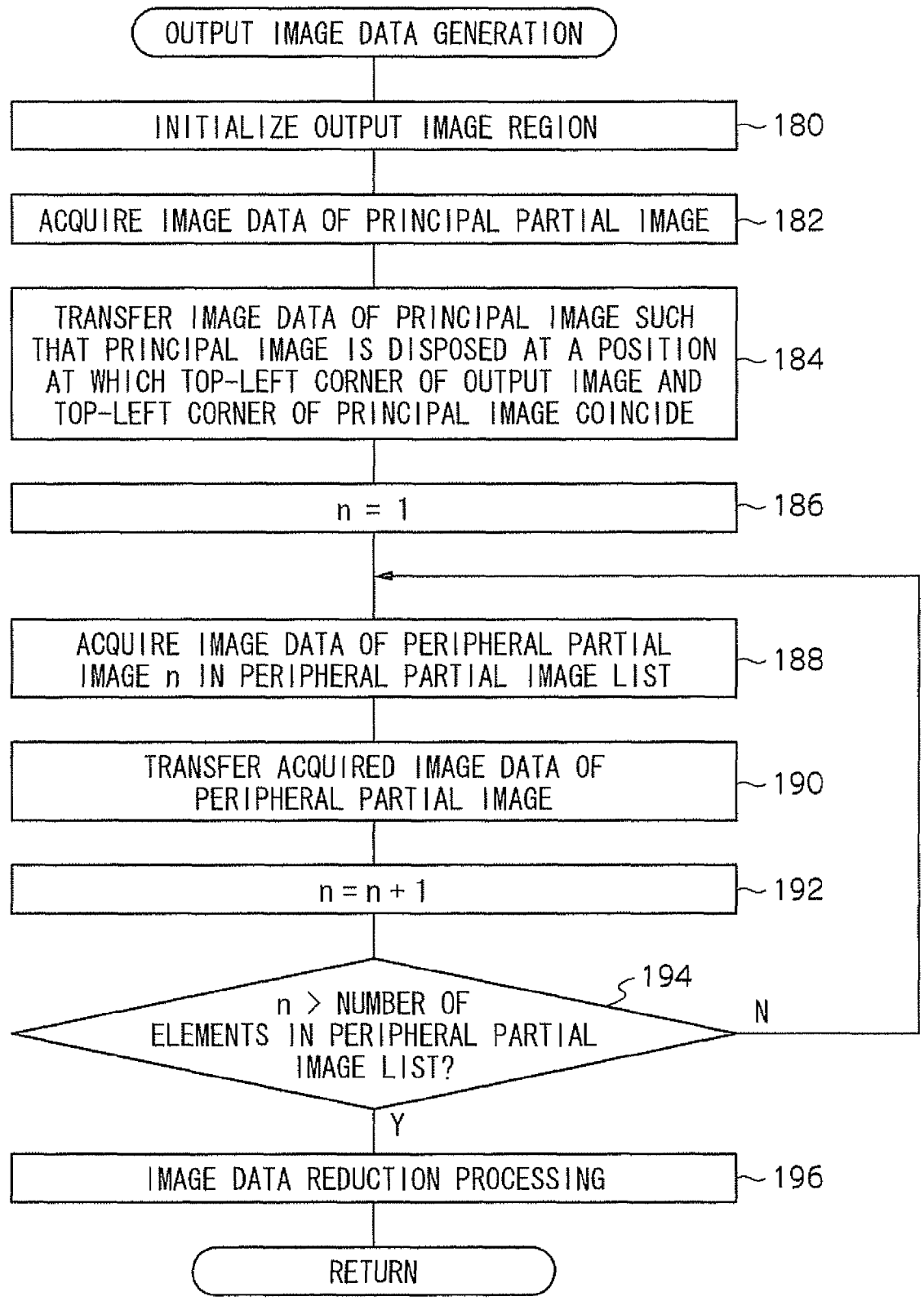
FIG. 7 is a flowchart showing an example of output image data generation.

After the peripheral partial image selection, in step 112, the output image data generation is carried out. FIG. 7 is a flowchart showing an example of the output image data generation executed by the CPU 12.

In step 180, the CPU 12 initializes a region of the RAM that is reserved for storing output image data (hereafter referred to as an output image region).

In step 182, the CPU 12 reads stored image data of the principal partial image from a storage region of the RAM 14 at which the principal partial image data has been stored.

In step 184, the CPU 12 transfers the image data of the principal partial image to the output image region such that the principal partial image is disposed at a position at which the top-left corner of the output image and the top-left corner of the principal partial image coincide.

In step 186, the CPU 12 sets a variable 'n' to 1.

In step 188, the CPU 12 reads image data of the peripheral partial image registered at position 'n' in the peripheral partial image list from a storage region of the RAM 14 at which the image data of the peripheral partial image at position 'n' has been stored.

In step 190, the CPU 12 transfers the read-out image data of the peripheral partial image in the 'n' position to the output image region, such that a position of the 'n' position peripheral partial image relative to the principal partial image in the output image is a position the same as the position of the 'n' position peripheral partial image relative to the principal partial image in the original image.

Here, an example is described in which the image data is transferred such that the positional relationship between the principal partial image and the peripheral partial image is the same in the output image as in the original image. However the positional relationship of the peripheral partial image relative to the principal partial image may be slightly altered, so long as the alteration is a small positional displacement accommodated within a pre-specified range such that the positional relationship will not be greatly altered to the viewing eye (that is, such that the positional relationship is preserved).

In step 192, the CPU 12 increments 'n' by 1.

In step 194, the CPU 12 determines whether or not 'n' exceeds the number of partial images registered in the peripheral partial image list. If the CPU 12 determines in step 194 that 'n' does not exceed the number of peripheral partial images registered in the peripheral partial image list, the CPU 12 returns to step 188 and the same processing as described above is repeated. Thus, the image data of the peripheral partial images registered in the peripheral partial image list is transferred.

On the other hand, if the CPU 12 determines in step 194 that 'n' exceeds the number of peripheral partial images registered in the peripheral partial image list, then synthesis of the principal partial image and all the peripheral partial images has ended. Hence, in step 196, the CPU 12 reduces the whole synthesized image data that has been transferred to the output image region, such that the output image will be accommodated in the output dimensions. This reduced image data serves as the output image data. If the output image will be accommodated in the output dimensions without reduction, the output image data is generated without being reduced (i.e., if a reduction scaling factor is in a range from 0 to 1, the reduction scaling factor is treated as being 1).

In a case in which the reduction scaling factor is within the scope of visibility and a peripheral partial image is a text partial image, the reduction may be at a reduction scaling factor such that a dimension of the characters will be at least a pre-specified dimension.

Here, description has been given for an example of a case of reduction after the image data of the principal partial image and the image data of the peripheral partial images have been synthesized. However, it is also possible to synthesize the image data of the principal partial image and the image data of the peripheral partial images after each has been separately reduced. In such a case, the respective reduction scaling factors may be the same. However, reduction with different reduction scaling factors is possible, provided the difference in scaling factors is within a pre-specified range such that the layout will not be greatly altered between the original image and the output image.

After the output image data Generation of step 112 has ended, in step 114, the CPU 12 outputs (transmits) the generated output image data to the display device 60 via the communications interface 20. When the display device 60 receives the output image data via the communications interface 70, the CPU 62 performs control on the basis of the received output image data so as to display the output image at the display 72. Thus, the output image is displayed at the display 72 of the display device 60. If there is no need to display the output image immediately, or suchlike, the image processing device 10 may output and save the output image at a recording medium such as the HDD 32 or the like. Further, the output image may be displayed at the display 38 of the image processing device 10 on the basis of the generated output image data.

The present invention is not to be limited to the exemplary embodiment described above. Numerous variations in design may be implemented within the scope of the invention described in the attached claims. Herebelow, a number of modifications will be described.

—First Modification—

For the peripheral partial image selection of the above exemplary embodiment, an example has been described in which peripheral partial images are selected under conditions such as "being an image completely contained in a region defined by the origin point at the top left of the principal partial image and the output dimensions", "being an image completely contained in a region defined by the origin point at the top left of the principal partial image and the output dimensions when the whole original image is reduced within a scope of visibility", or the like. However, specification such that a partial image that is a partial image disposed peripherally to the principal partial image and that satisfies one or more of the following defined conditions is selected as a peripheral partial image is possible: the position of placement thereof within a pace constituting the original image, the position within the whole original image, a pixel characteristic and the category. Thus, the conditions are not limited to the specific examples above.

For example, peripheral partial images may be selected with the conditions being that a partial image is within a pre-specified range from the principal partial image and the category is 'text'.

The above selection conditions may be determined with dependence on one or more of: a position of placement of the principal partial image within a page constituting the original image, the position of the principal partial image in the whole original image, the size thereof the pixel characteristic(s) of the principal partial image, and the category of the principal partial image.

For example, if the category of the principal partial image is 'table', a peripheral partial image may be selected with the condition being that it is a text partial image that is an isolated portion with a small number of lines disposed directly above or directly below the principal partial image. This is because a text with a small number of lines disposed above or below a table will often be text indicating the subject of the table.

Further, if the category of the principal partial image is 'graph', a partial image may be selected whose distance from the principal partial image is within a specified range and whose color composition is the same (or substantially the same) as the principal partial image. This is because a partial image with the same color composition as a graph will often show a specific example associated with the graph.

The conditions may be determined such that, if the principal partial image is disposed at the top-left corner of a page constituting the original image, a partial image directly below the principal partial image is selected, but if the principal partial image is disposed at the bottom-left corner of a page constituting the original image, a partial image directly above the principal partial image is selected, and so forth.

The periphery of the principal partial image may be searched in a pre-specified sequence, such as below→right→above→left or the like, and a partial image that is found first selected as a peripheral partial image. In this case, only one partial image is selected as the peripheral partial image. That is, levels of precedence according to position of placement are determined beforehand for partial images disposed each of directly above, directly below, directly left and directly right of the principal partial image. Thus, a partial image that is disposed at the position with the highest level of precedence is selected as the peripheral partial image.

Figure 11:
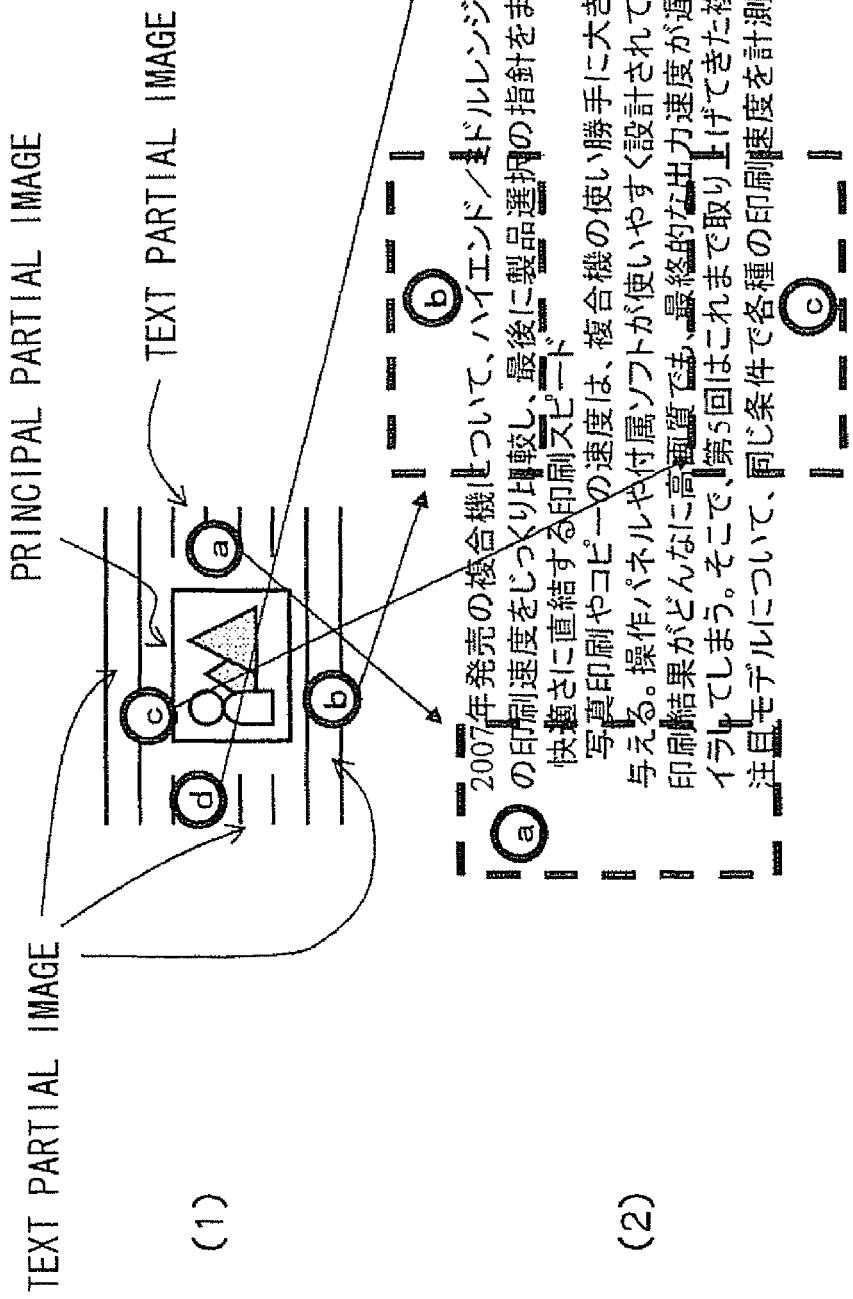
FIG. 11 is a view showing an example of placement of a principal partial image and peripheral partial images, and a view showing examples of extracted portions when a portion of a peripheral partial image categorized as text is extracted.

For example, the periphery of a principal partial image is searched in the sequence below→right→above→left. In FIG. 11 (1), partial images are disposed at all of the positions to above, below, left and right of the principal partial image. Therefore, the partial image 'a' disposed directly below the principal partial image is selected.

—Second Modification—

In the above-described output image data generation, depending on the peripheral partial image selection conditions, if the image data is reduced such that the whole of the principal partial image and the peripheral partial images are accommodated in the output dimensions, there may be cases in which the content is reduced to be so small as to not be discernable with the human eye.

Therefore, rather than synthesizing all of the image data of the peripheral partial images, portions thereof may be extracted and synthesized with the image data of the principal partial image, and the output image data generated with a reduction scaling factor at which the principal partial image and the portions of the peripheral partial images are accommodated in the output dimensions within the scope of visibility. Alternatively, these may be separately reduced before synthesis and then synthesized.

If there are plural peripheral partial images, portions may be extracted from each set of image data of the peripheral partial images and synthesized with the image data of the principal partial image, and the synthesized image data reduced to generate the output image data. It is also possible to extract and use portions from the image data of one or more peripheral partial images of plural peripheral partial images, use the whole of the image data of the other peripheral partial images, synthesize these with the image data of the principal partial image, and reduce the synthesized image data to generate the output image data. Alternatively, these may be separately reduced before synthesis and then synthesized.

—Third Modification—

If a portion is to be extracted from the image data of a peripheral partial image and used as described in second modification, in the peripheral partial image selection of step 110, the conditions may be specified so as to select a portion for which an amount of information that is included (below referred to as an extracted information amount) is largest or a portion for which the included information amount is at or above a pre-specified amount. The extracted information amount is determined from the number of colors, the spatial frequency, the number of edges, the number of line portions or the like.

Now, an example will be specifically described of a case in which the principal partial image is selected by the condition "a partial image having the category picture", and a peripheral partial image is selected by the condition "a partial image with the category text that is disposed at a distance from the principal partial image within a pre-specified range, and if there are plural text partial images within that range, the partial image of those partial images with the largest extracted information amount".

In the example illustrated in FIG. 11 (1), partial images of text are disposed to each of above, below, left and right of the principal partial image. Accordingly, the CPU 12 finds values representing extraction information amounts (for example, one or more of number of colors, spatial frequency, number of edges, number of line portions and number of characters) for all of the text partial images 'a', 'b', 'c' and 'd', and selects the partial image with the highest value as the peripheral partial image.

In FIG. 11 (2), examples of extraction images of portions thereof are illustrated for each of the partial images 'a', 'b', 'c' and 'd'. The regions shown by broken lines are the extraction images. Here, in order to simplify the illustration, extraction images of the partial images 'a', 'b', 'c' and 'd' are exemplified using a common text. The CPU 12 first finds values representing respective extraction information amounts in an unreduced state.

The CPU 12 finds a value representing an extraction information amount of a portion (an extraction portion) of the partial image 'a' that will be accommodated within the output dimensions if the principal partial image is disposed at a position at which the top-left corner of the output image and the top-left corner of the principal partial image coincide and the partial image 'a' is disposed to the right side of the principal partial image.

Then, the CPU 12 finds a value representing an extraction information amount of a portion of the partial image 'b' that will be accommodated within the output dimensions if the principal partial image is disposed at the position at which the top-left corner of the output image and the top-left corner of the principal partial image coincide and the partial image 'b' is disposed to the lower side of the principal partial image.

Then, the CPU 12 finds a value representing an extraction information amount of a portion of the partial image 'c' that will be accommodated within the output dimensions if the principal partial image is disposed at a position at which the bottom-right corner of the output image and the bottom-right corner of the principal partial image coincide and the partial image 'c' is disposed to the upper side of the principal partial images.

Then, the CPU 12 finds a value representing an extraction information amount of a portion of the partial image 'd' that will be accommodated within the output dimensions if the principal partial image is disposed at the position at which the bottom-right corner of the output image and the bottom-right corner of the principal partial image coincide and the partial image 'd' is disposed to the left side of the principal partial image.

Finally, the CPU 12 compares the respective values that have been found and selects the partial image with the largest value.

In a case in which all the partial images would be outside the unreduced output dimensions, the CPU 12 finds values representing the extraction information amounts in the same manner as above but for a state which is reduced by a pre-specified reduction scaling factor (for example, a maximum reduction scaling factor within the scope of visibility). Then, the CPU 12 compares the respective values that are found and selects the partial image with the largest value.

—Fourth Modification—

In second modification, an example is described in which a portion of a peripheral partial image is extracted and used to generate the output image data. In such a case, in addition to the peripheral partial image, a portion of the principal partial image too may be extracted and used to generate the output image data. Herebelow, a modification of a case of creating output image data in this manner is described with reference to FIG. 8.

Figure 8:
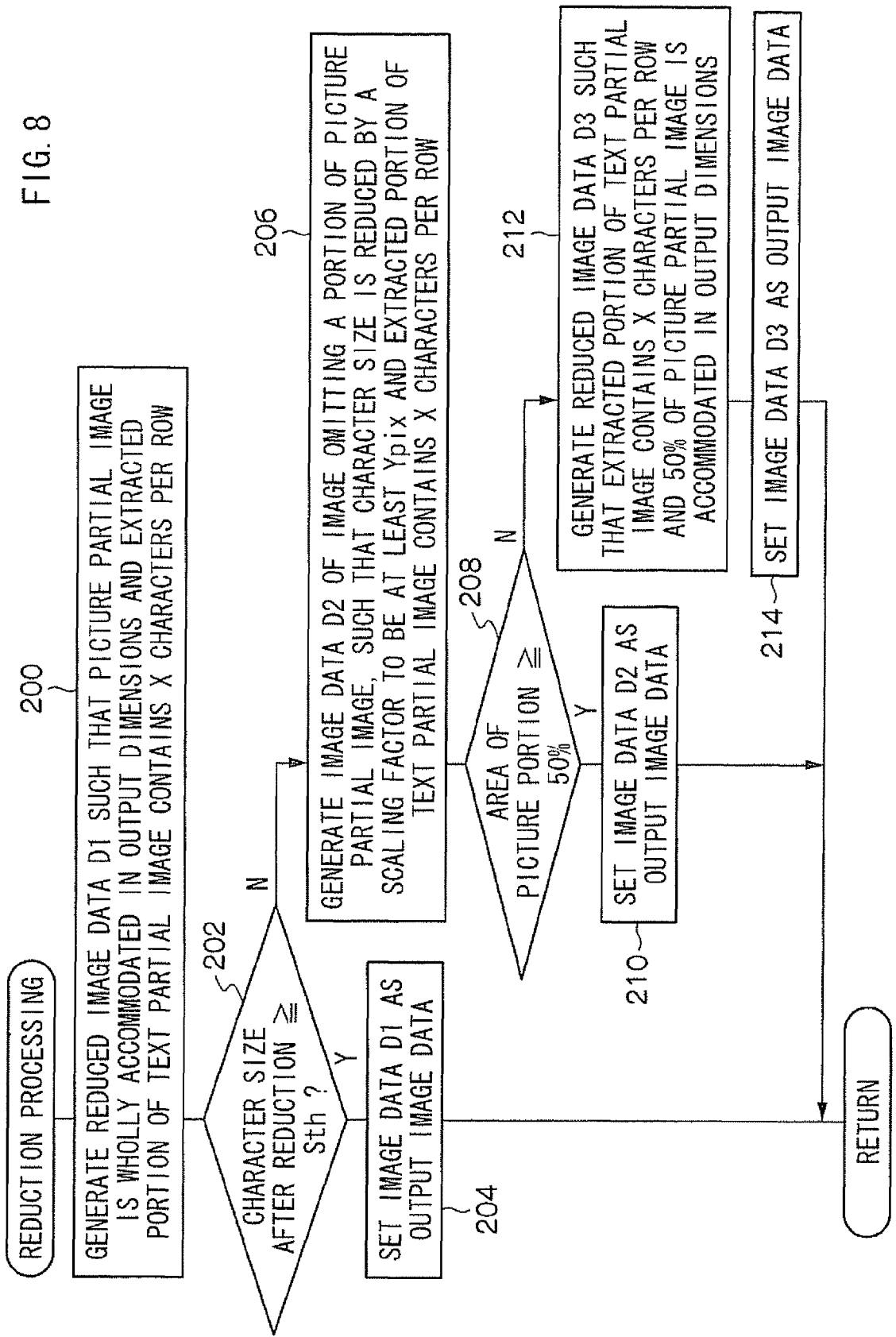
FIG. 8 is a flowchart showing details of processing that is carried out in step 196 of FIG. 7, in a case in which the output image data is generated by extracting and using a portion of a peripheral partial image or portions of a principal partial image and a peripheral partial image.

FIG. 8 is a flowchart showing details of an example of processing that is carried out in step 196 of FIG. 7 in a case in which the output image data is generated by extracting and using a portion of a peripheral partial image or portions of the principal partial image and the peripheral partial image.

Figure 12:
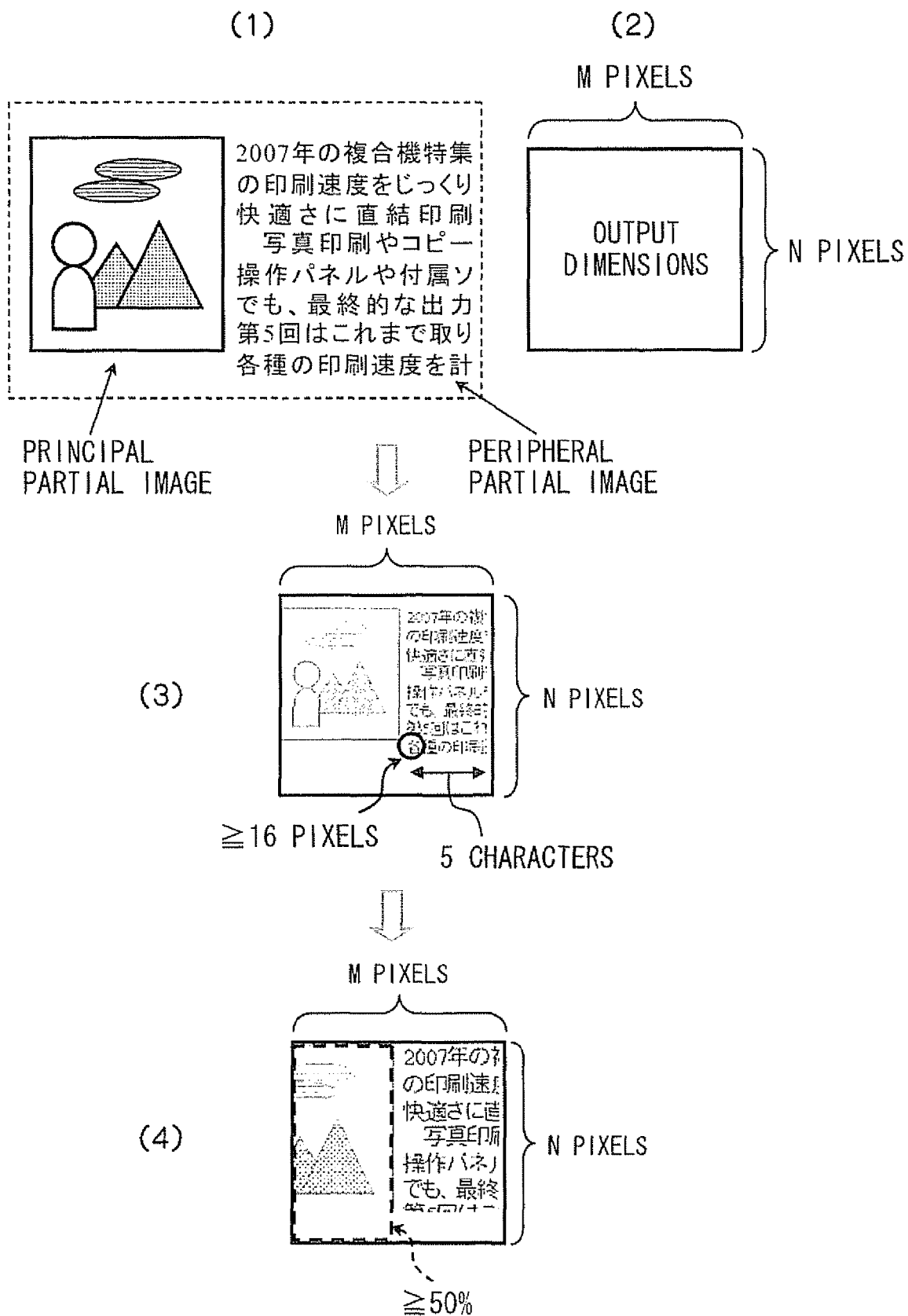
FIG. 12 is a descriptive view describing output image data Generation process of a fourth modification of the exemplary embodiment.

Here, the output image data generation is described for a case in which a picture partial image is selected as the principal partial image and a single text partial image is selected as the peripheral partial image, as shown in FIG. 12 (1). The term picture partial image here indicates partial images with categories other than text, such as tables, ruled lines, frames, seals, photographs, CG illustrations and so forth. Respective reduction scaling factors of the principal partial image and the peripheral partial image when the image data of the output image is being generated are the same.

In step 200, the CPU 12 generates reduced image data D1 such that, in the output dimensions shown in FIG. 12 (2), the synthesized image data transferred to the output image region will contain the whole of the picture partial image and contain X characters of each row in an extracted portion of the text partial image. In the present exemplary embodiment, X characters=5 characters.

Figure 13:
FIG. 13 is a descriptive view describing a method of finding a text size.

In step 202, the CPU 12 finds a character size of the text partial image after reduction and determines whether or not the character size will be at least a pre-specified threshold value Sth. For the character size, a breadth (in pixel units in this case) is calculated for each row (in the case of horizontal text) or each column (in the case of vertical text) of the text partial image, as shown by the example in FIG. 13, and an average value is used as the value representing the character size. The threshold value Sth is a value representing a minimum size at which text outlines can be discerned. Here, the threshold Sth is set to 16 pixels, but the present invention is not to be limited by this value.

If the CPU 12 determines in step 202 that the reduced character size is at or above the threshold value Sth (16 pixels in this case), then in step 204 the image data D1 is set as the output image data (see FIG. 12 (3)).

Alternatively, if the CPU 12 determines in step 202 that the reduced character size will be below the threshold value Sth, then in step 206 the CPU 12 generates image data D2. A portion of the picture partial image is omitted from the image data D2, such that the whole of the synthesized image data transferred to the output image region is reduced by a scaling factor at which a character size of the text partial image will be at least Ypix and X characters per row in the extracted portion of the text partial image will be contained within the output dimensions.

In step 208, the CPU 12 determines whether or not an area of the picture partial image from which the above-mentioned portion is omitted, in the image represented by the image data D2, is an area of at least R % of the area of the whole picture partial images. Here, R % is 50%, but the invention is not to be limited by this value.

If the CPU 12 determines in step 208 that the area of the picture partial image from which the above-mentioned portion is omitted is at or above R % of the total area of the picture partial image, then in step 210 the image data D2 is set as the output image data (see FIG. 12 (4)).

Alternatively, if the CPU 12 determines in step 208 that the area of the picture partial image from which the above-mentioned portion is omitted is below R % of the total area of the picture partial image, then in step 212 the CPU 12 determines a reduction scaling factor such that at least R % of the picture partial image and X characters per row of the text partial image will be contained in the output dimensions, and generates image data D3 in which the synthesized image data transferred to the output image region is reduced by the determined reduction scaling factor.

Then, in step 214, the CPU 12 sets the image data D3 as the output image data. Here, the character size of the text partial image contained in the image data D3 may be less than Sth, the minimum size at which text outlines can be discerned. However, the image data D3 is set as the output image data here because the state of arrangement of the partial images and the forms of the partial images or the like may be discerned even if the character size is less than Sth.

Note that the respective values of the character minimum size (16 pixels), the number of characters included per row of a text partial image (5 characters) and the proportional area of a picture (50%) exemplified here are examples; other values are possible. Moreover, the specification of which requirement is prioritized if the conditions are not all satisfied (in the above description, the number of characters is given priority over the character size when the ultimate image data D3 is generated, or the like) is also an example. Conversely, the character size may be prioritized over the number of characters in creating the output image data. Furthermore, these values and requirements (below collectively referred to as output image data generation conditions) may be specified in advance, and may be designated dynamically during execution of the processing for creating the output image data.

Further, the output image data generation conditions may be automatically particularly specified in accordance with the type of original (the original image), the type of the principal partial image, display conditions of the display device 60 displaying the output image, and the like.

Here, the type of original means types representing contents of the original, such as pamphlets, technical documents, accounting records and the like. Types of originals may also be classified by ease of reading of the actual text, whether or not verbatim reading needs to be possible for general applicability of text arrangements, and the like. The type of the principal partial image may be classified by the category, the number of colors, the spatial frequency, the number of edges, the number of line portions, the number of characters and the like. Display characteristics of the display terminal means, for example, resolution, ability to reproduce the number of colors, capabilities of an image processing processor, and the like.

Furthermore, the output image data generation conditions may be specified individually for users. The type of document, type of principal partial image and display terminal display characteristics may be designated by a user each time output image data is generated, and the output image data generation conditions may be specified in accordance with the designations. Further yet, the type of original may be automatically analyzed and the output image data generation conditions automatically specified.

In fourth modification, an example has been described in which the output image data is generated with a number of characters per row being determined. However, the output image data may be generated with a number of characters per column being determined.

—Fifth Modification—

In a case of generating output image data in which a portion of the principal partial image is extracted and placed, as in image data D2 or D3 of fourth modification, a portion including the largest amount of information (below referred to as the extracted information amount) or a portion of at least a pre-specified information amount may be specified and extracted from the principal partial image A volume of the extracted information amount is determined from the number of colors, the spatial frequency, the number of edges, the number of line portions or the like.

In the peripheral partial image selection, a peripheral partial image may be selected in accordance with a location of extraction of the principal partial image. For example, if a portion is extracted from the principal partial image to generate the output image data in the case of the original image shown in FIG. 11 (1), then if the portion extracted from the principal partial image is the right half, the text partial image 'a' neighboring the right half region is selected. If the portion extracted from the principal partial image is the lower half, the text partial image 'b' neighboring the lower half region is selected, if the portion extracted from the principal partial image is the upper halt the text partial image 'c' neighboring the upper half region is selected, and if the portion extracted from the principal partial image is the left half, the text partial image 'd' neighboring the left half region is selected.

In the above exemplary embodiment, a case in which the output image data is generated by the image processing device 10 has been described. However, the output image data may be generated and displayed by the display device 60.

Herein, the above exemplary embodiment and modifications describe examples in which the functions of the image processing device are realized by a recording medium at which software is recorded, but the same may be realized by hardware.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image processing device comprising:
 a principal partial image selector configured to select a principal partial image from a plurality of partial images that constitute an original image;
 a peripheral partial image selector configured to select a peripheral partial image, which is disposed peripherally to the principal partial image in the original image and satisfies a pre-specified condition; and
 a generator configured to generate output image data, in which the principal partial image and the peripheral partial image are placed so as to preserve a positional relationship thereof in the original image, the generator first reducing the peripheral partial image using a first scaling factor depending on conditions related to the peripheral partial image, and the generator thereafter reducing the principal partial image using a second scaling factor depending on conditions related to the principal partial image so that the principal partial image and the peripheral partial image are accommodated in output dimensions, a difference between the respective scaling factors being within a pre-specified range.

2. The image processing device according to claim 1, wherein the generator is configured to generate the output image data in which
 one of a portion extracted from the principal partial image and the whole of the principal partial image is placed in the output dimensions, and
 one or more peripheral partial image, including an extracted portion of at least one of the peripheral partial image, is placed in a remaining region that remains after the portion or whole of the principal partial image has been placed.

3. The image processing device according to claim 2, wherein if the peripheral partial image whose portion is extracted is a partial image categorized as text, the generator is configured to generate the output image data in which the portion is placed, the portion having been reduced with a first scaling factor that satisfies at least one of
 a first condition of a dimension of text included in the portion being at least a pre-specified dimension, and
 a second condition of a number of characters per row or per column of the text included in the portion being at least a pre-specified number.

4. The image processing device according to claim 2, wherein when the generator generates the output image data in which an extracted portion of the principal partial image is placed, the generator is configured to determine a position of the extracted portion based on an amount of information included in the extracted portion.

5. The image processing device according to claim 2, wherein the generator is configured to generate output image data in which the principal partial image and the peripheral partial image are reduced with second and first scaling factors within a scope of visibility, reduction within the scope of visibility being reduction with a scaling factor determined on the basis of an amount of information that is included in the extracted portion of the principal partial image or the peripheral partial image after reduction.

6. The image processing device according to claim 1, wherein if the peripheral partial image is a partial image categorized as text, the generator is configured to generate the output image data in which the peripheral partial image is placed, the peripheral partial image having been reduced with a first scaling factor at which a dimension of text included in the peripheral partial image is at least a pre-specified dimension.

7. The image processing device according to claim 1, wherein the principal partial image selector is configured to select as the principal partial image one of
   a partial image designated by a user and
   a partial image that satisfies a condition specifying at least one of a position of:
      placement in a page constituting the original image,
      a position in the whole original image,
      a size,
      a pixel characteristic, and
      a category.

8. The image processing device according to claim 1, wherein the peripheral partial image selector is configured to select as the peripheral partial image a partial image that satisfies a condition specifying at least one of a position of:
   placement in a page constituting the original image,
   a position in the whole original image,
   a size,
   a pixel characteristic, and
   a category.

9. The image processing device according to claim 2, wherein the peripheral partial image selector is configured to select as the peripheral partial image a partial image that satisfies a condition specifying at least one of:
   a position of placement in a page constituting the original image,
   a position in the whole original image,
   a size,
   a pixel characteristic,
   a category, and
   in a case in which the generator generates the output image data in which an extracted portion of the peripheral partial image is placed, an amount of information included in the extracted portion.

10. The image processing device according to claim 1, wherein the peripheral partial image selector is configured to select as the peripheral partial image a partial image that is included with the principal partial image in a region defined by the output dimensions whose content is reduced within a scope of visibility, reduction within the scope of visibility being reduction with a scaling factor determined on the basis of an amount of information that is included in the region defined by the output dimensions after reduction.

11. The image processing device according to claim 1, further comprising a display section configured to display an output image based on the output image data generated by the generator.

12. An image display system comprising:
   an image transmission device including
      the image processing device according to claim 1 and
      a transmitter configured to transmit the output image data generated by the image processing device; and
   a display device including
      a receiver configured to receive the output image data transmitted from the image transmission device and
      a display section configured to display an output image based on the output image data received by the receiver.

13. A non-transitory computer readable storage medium storing a program causing a computer to execute a process for image processing, the process comprising:
   selecting a principal partial image from a plurality of partial images that constitute an original image;
   selecting a peripheral partial image, which is disposed peripherally to the principal partial image in the original image and satisfies a pre-specified condition; and
   generating output image data, in which the principal partial image and the peripheral partial image are placed so as to preserve a positional relationship thereof in the original image, the peripheral partial image being reduced using a first scaling factor depending on conditions related to the peripheral partial image, and the principal partial image thereafter being reduced using a second scaling factor depending on conditions related to the principal partial image so that the principal partial image and the peripheral partial image are accommodated in output dimensions, a difference between the respective scaling factors being within a pre-specified range.

14. A method for image processing an original image to be displayed on a display device, the method for image processing comprising:
   selecting a principal partial image from a plurality of partial images that constitute the original image;
   selecting a peripheral partial image, which is disposed peripherally to the principal partial image in the original image and satisfies a pre-specified condition; and
   generating output image data, in which the principal partial image and the peripheral partial image are placed so as to preserve a positional relationship thereof in the original image, the peripheral partial image being reduced using a first scaling factor depending on conditions related to the peripheral partial image, and the principal partial image thereafter being reduced using a second scaling factor depending on conditions related to the principal partial image so that the principal partial image and the peripheral partial image are accommodated in output dimensions, a difference between the respective scaling factors being within a pre-specified range.

* * * * *